(12) United States Patent
Heverly, II

(10) Patent No.: US 10,648,529 B2
(45) Date of Patent: May 12, 2020

(54) HYDRAULIC VIBRATION CONTROL

(71) Applicant: Bell Helicopter Textron Inc., Fort Worth, TX (US)

(72) Inventor: David E. Heverly, II, Arlington, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 319 days.

(21) Appl. No.: 15/820,129

(22) Filed: Nov. 21, 2017

(65) Prior Publication Data

US 2019/0154106 A1 May 23, 2019

(51) Int. Cl.
| | | |
|---|---|---|
| *B06B 1/18* | (2006.01) | |
| *F16F 15/023* | (2006.01) | |
| *B64C 29/00* | (2006.01) | |

(52) U.S. Cl.
CPC .......... *F16F 15/0235* (2013.01); *B06B 1/183* (2013.01); *B06B 1/186* (2013.01); *B64C 29/0033* (2013.01)

(58) Field of Classification Search
CPC ..... B06B 1/183; B06B 1/186; B64C 29/0033; B64C 2027/003; B64C 2027/004; B64C 27/001; B64C 27/52; F16F 15/0235; F16F 7/1017
USPC ....................................................... 244/76 R
See application file for complete search history.

(56) References Cited

U.S. PATENT DOCUMENTS

| | | | | |
|---|---|---|---|---|
| 2,989,951 | A * | 6/1961 | Charlson ................ | F01C 17/06 418/167 |
| 3,617,020 | A * | 11/1971 | Gerstine ............... | B64C 27/001 244/17.27 |
| 5,092,195 | A * | 3/1992 | Parsons ................... | F16F 15/18 310/114 |
| 5,347,884 | A | 9/1994 | Gamjost et al. | |
| 5,825,663 | A * | 10/1998 | Barba ..................... | B06B 1/166 702/41 |
| 5,903,077 | A | 5/1999 | Gamjost et al. | |
| 6,427,657 | B1 * | 8/2002 | Egleston ................ | F02B 67/04 123/192.2 |
| 7,448,854 | B2 | 11/2008 | Jolly et al. | |
| 7,686,246 | B2 | 3/2010 | Badre-Alam et al. | |
| 7,722,322 | B2 * | 5/2010 | Altieri .................... | G01M 1/22 415/119 |
| 8,313,296 | B2 | 11/2012 | Jolly et al. | |
| 8,435,002 | B2 | 5/2013 | Jolly et al. | |
| 9,145,946 | B2 * | 9/2015 | Heverly, II ......... | F16F 15/0275 |
| 10,361,606 | B2 * | 7/2019 | Sautier ................ | H02K 7/1823 |

(Continued)

*Primary Examiner* — Claude J Brown
(74) *Attorney, Agent, or Firm* — Patent Capital Group

(57) ABSTRACT

In one embodiment, a centrifugal force generating device comprises a first hydraulic rotor, a second hydraulic rotor, and one or more hydraulic control valves. The first hydraulic rotor comprises a first mass and is configured to rotationally drive the first mass around a first axis of rotation using a first flow of hydraulic fluid through the first hydraulic rotor. The second hydraulic rotor comprises a second mass and is configured to rotationally drive the second mass around a second axis of rotation using a second flow of hydraulic fluid through the second hydraulic rotor. The one or more hydraulic control valves are configured to control the first flow of hydraulic fluid through the first hydraulic rotor and the second flow of hydraulic fluid through the second hydraulic rotor.

20 Claims, 7 Drawing Sheets

(56) References Cited

U.S. PATENT DOCUMENTS

| | | | |
|---|---|---|---|
| 2005/0075210 A1* | 4/2005 | Frederickson | B06B 1/16 475/346 |
| 2006/0083617 A1* | 4/2006 | Jolly | B64C 27/001 416/133 |
| 2010/0209242 A1* | 8/2010 | Popelka | B64C 27/001 416/1 |
| 2011/0027081 A1* | 2/2011 | Jolly | B64C 27/001 416/1 |
| 2012/0181377 A1* | 7/2012 | Eller | B64C 27/001 244/17.11 |
| 2012/0207602 A1* | 8/2012 | Matalanis | B64C 27/615 416/131 |
| 2015/0097072 A1* | 4/2015 | Welch | B64C 27/001 244/17.11 |
| 2018/0373338 A1* | 12/2018 | Deutsch | A63F 13/00 |

* cited by examiner

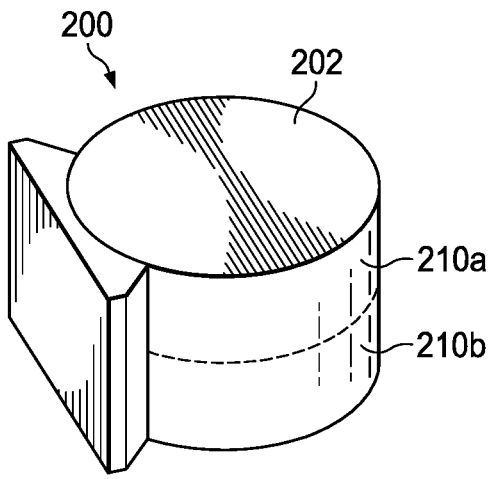
FIG. 2A
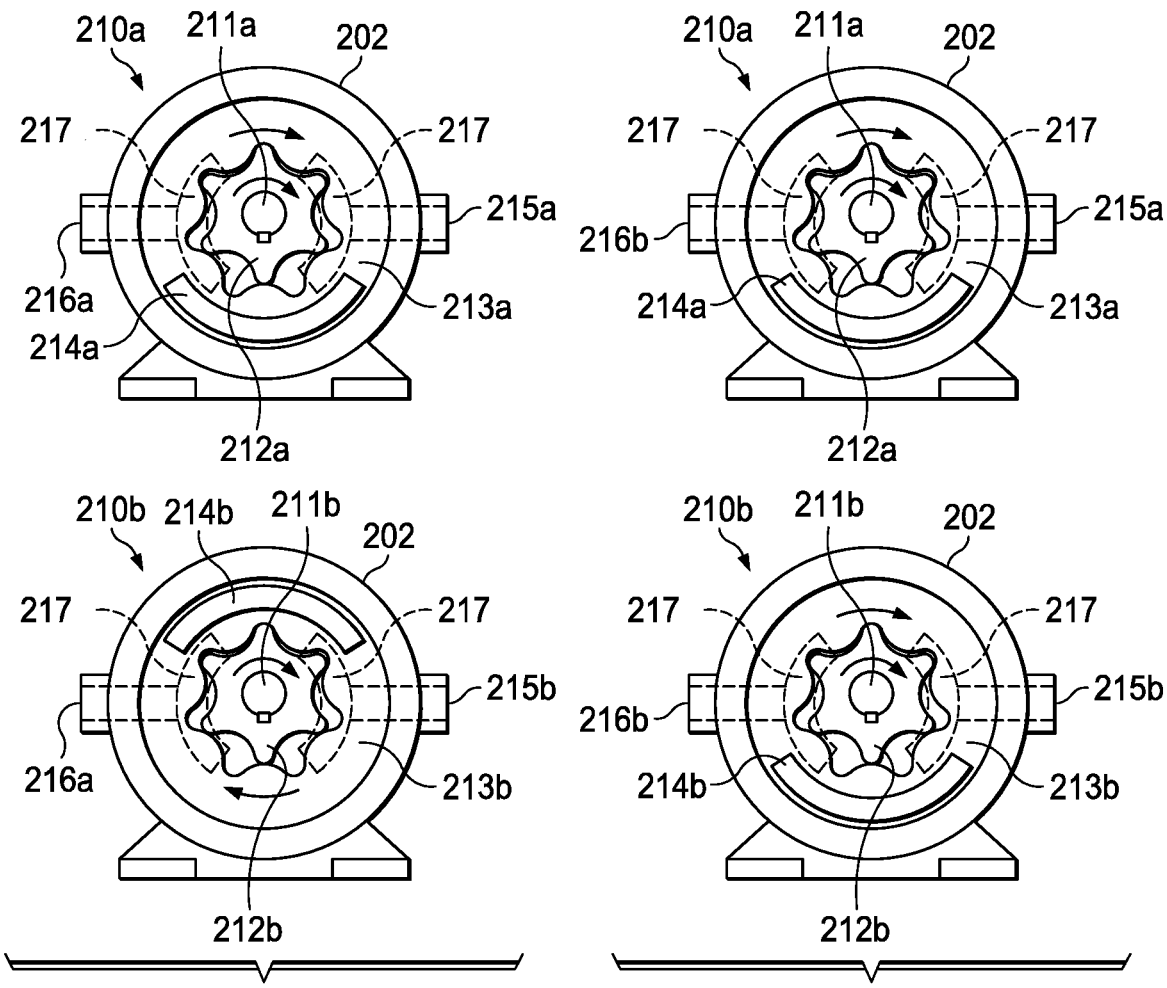
FIG. 2B
FIG. 2C

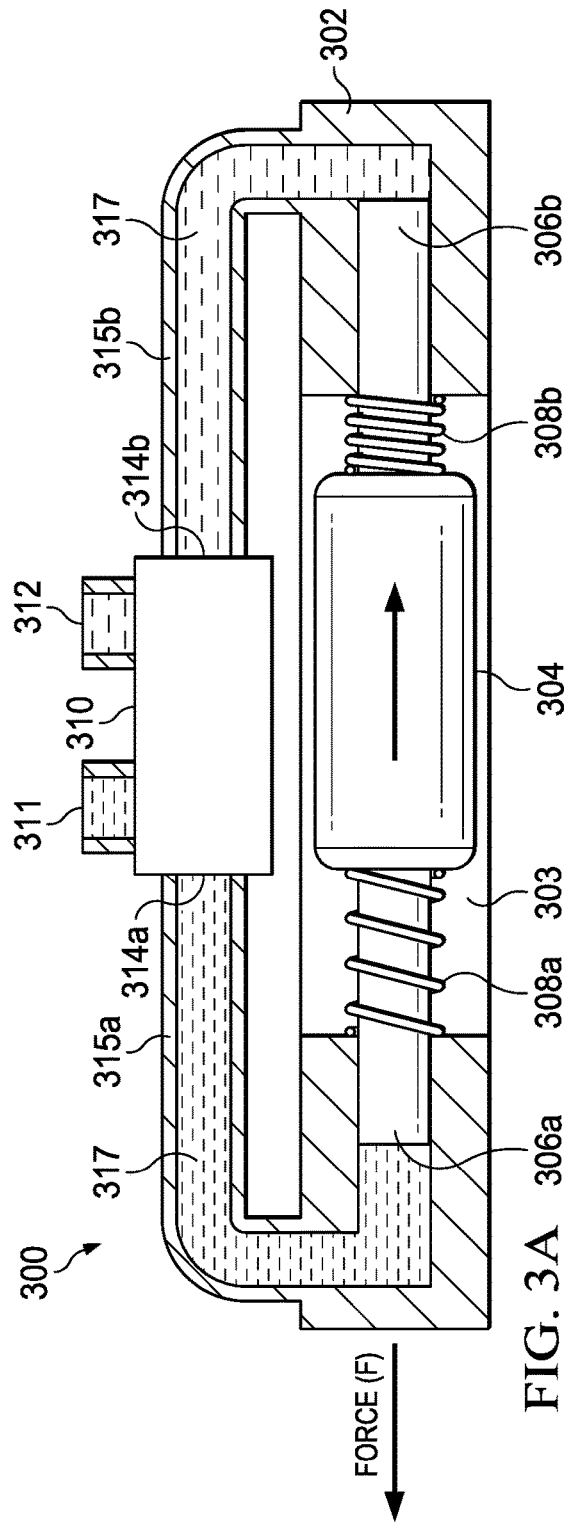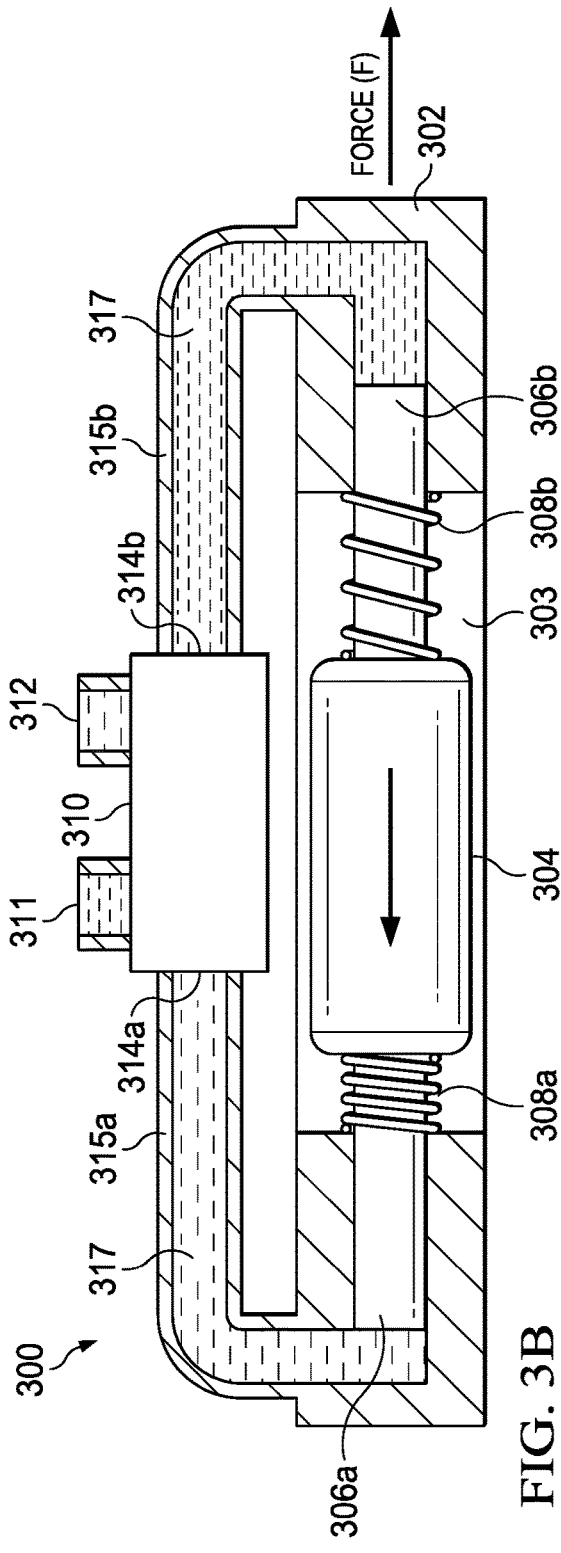

HYDRAULIC VIBRATION CONTROL

TECHNICAL FIELD

This disclosure relates generally to vibration control, and more particularly, though not exclusively, to hydraulic-based vibration control.

BACKGROUND

During operation, an aircraft may be subjected to vibrations. For example, during flight, the rotors, propellers, and/or engines of an aircraft may produce vibrations throughout the aircraft. Excessive vibrations may be harmful to an aircraft, however, as they can negatively impact its structural integrity, mechanical integrity, and/or performance. Moreover, excessive vibrations are often undesirable to passengers of an aircraft, as the vibrations can produce loud noise and/or cause the aircraft to shake, which negatively impacts passenger comfort.

SUMMARY

According to one aspect of the present disclosure, a centrifugal force generating device comprises a first hydraulic rotor, a second hydraulic rotor, and one or more hydraulic control valves. The first hydraulic rotor comprises a first mass and is configured to rotationally drive the first mass around a first axis of rotation using a first flow of hydraulic fluid through the first hydraulic rotor. The second hydraulic rotor comprises a second mass and is configured to rotationally drive the second mass around a second axis of rotation using a second flow of hydraulic fluid through the second hydraulic rotor. The one or more hydraulic control valves are configured to control the first flow of hydraulic fluid through the first hydraulic rotor and the second flow of hydraulic fluid through the second hydraulic rotor.

BRIEF DESCRIPTION OF THE DRAWINGS

FIGS. 2A-C illustrate an example embodiment of a hydraulic-powered centrifugal force generator.

FIGS. 3A-B illustrate an example embodiment of a hydraulic-powered linear force generator.

DETAILED DESCRIPTION

Figure 1A:
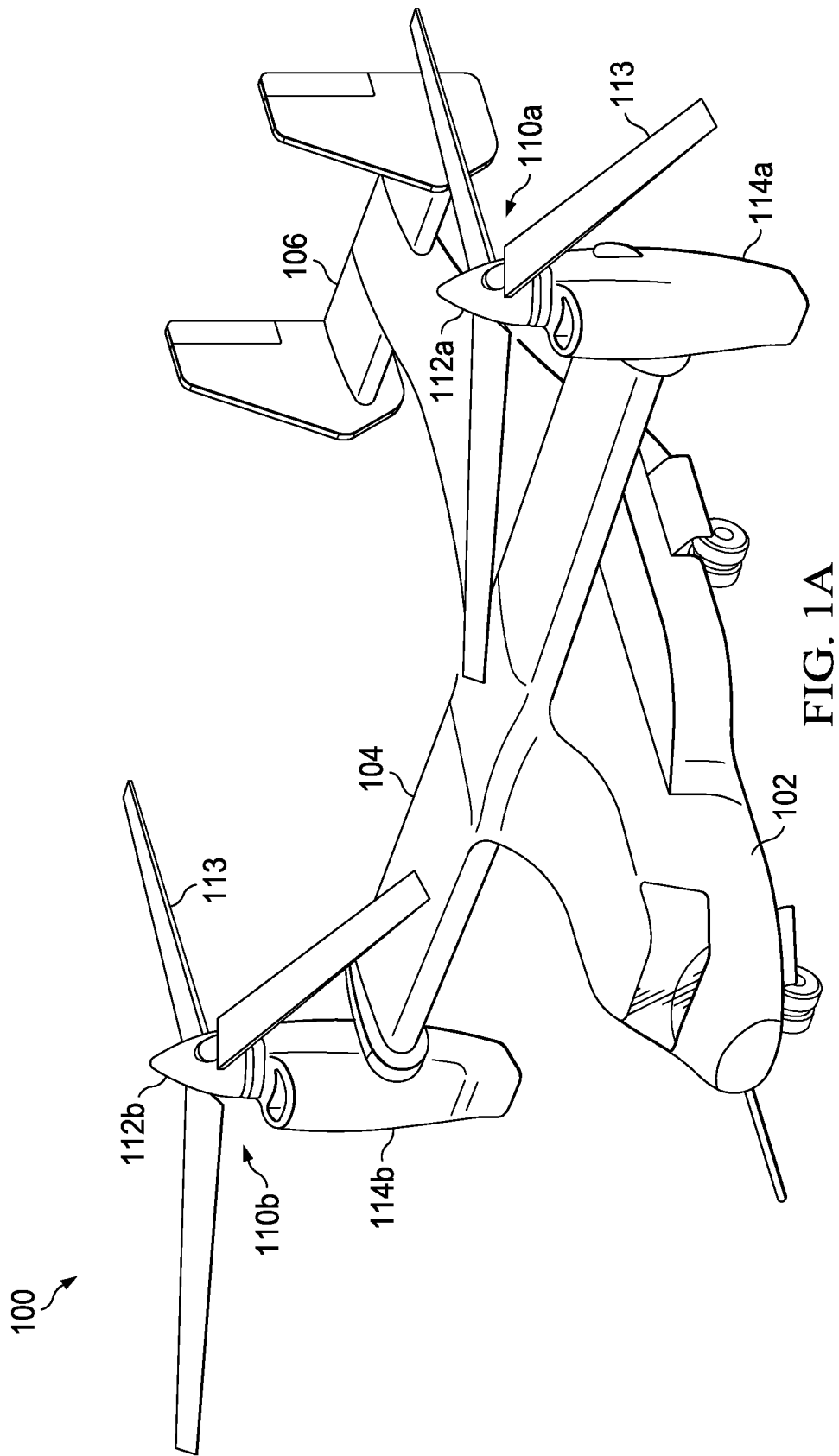
FIGS. 1A-B illustrate an example embodiment of a tiltrotor rotorcraft with a hydraulic vibration control system.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1B:
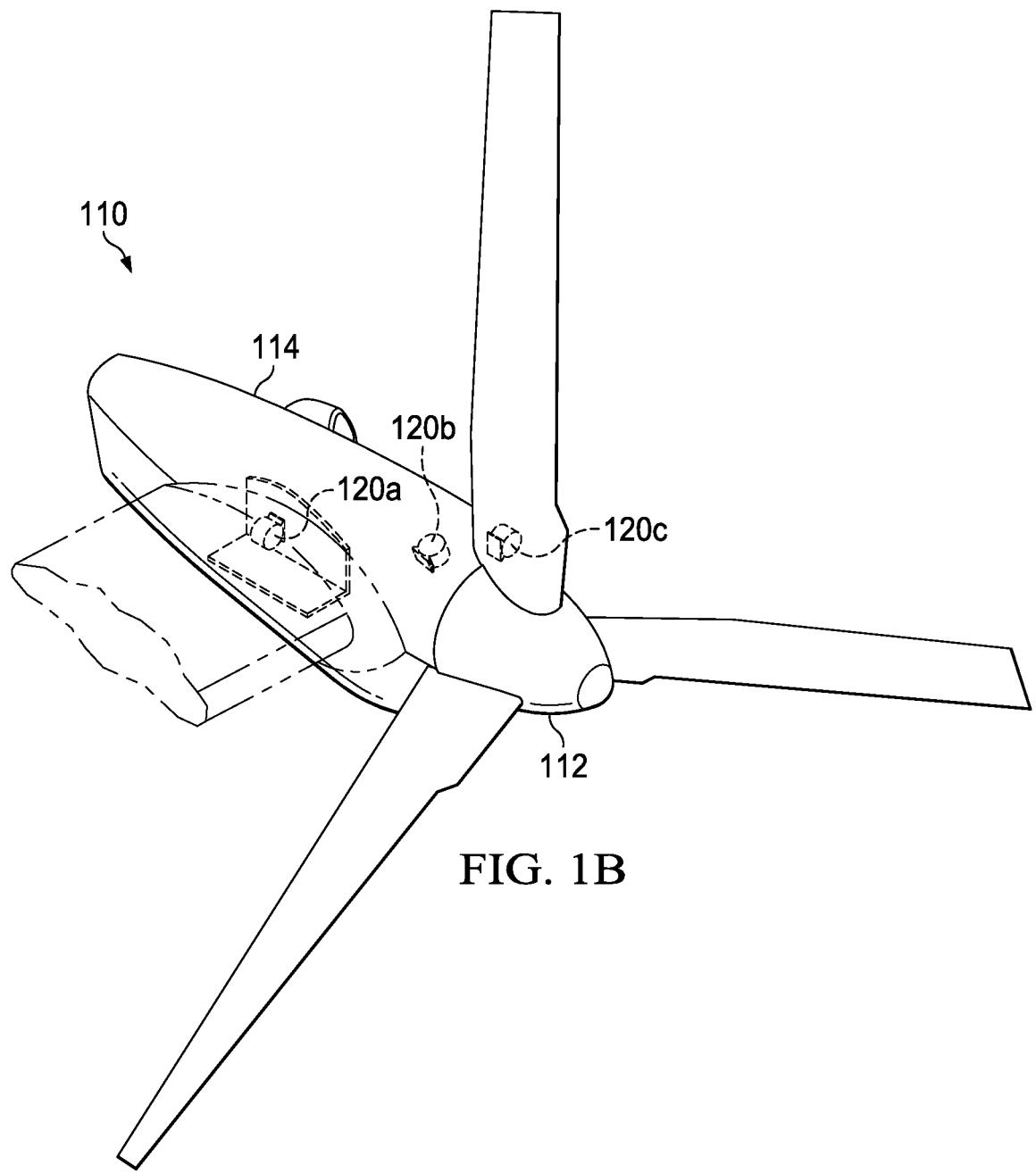

FIGS. 1A-B illustrate an example embodiment of a tiltrotor aircraft 100 with a hydraulic vibration control system. In particular, FIG. 1A illustrates an example tiltrotor aircraft 100, and FIG. 1B illustrates a close-up view of one of its tiltrotors 110.

As shown in FIG. 1A, tiltrotor aircraft 100 includes a fuselage 102, wing 104, empennage 106, and tiltrotors 110a and 110b. The fuselage 102 is the body of tiltrotor aircraft 100, and may include a cabin (e.g., for crew, passengers, and/or cargo) and/or housing for certain mechanical and electrical components (e.g., engine(s), transmission, and/or flight controls). Moreover, the flight capabilities of tiltrotor aircraft 100 are provided by tiltrotors 110a,b, wing 104, and empennage 106. For example, tiltrotors 110a,b enable tiltrotor aircraft 100 to support both a helicopter mode and an airplane mode. In the illustrated embodiment, tiltrotors 110a,b respectively include rotors 112a,b that are mounted on nacelles 114a,b at the outboard ends of wing 104. Rotors 112a,b each include a plurality of rotor blades 113, and nacelles 114a,b house various other components associated with rotors 112a,b, such as engine(s) and/or gearboxes (not shown). The engine(s) and gearboxes can be used to drive torque to rotors 112a,b to cause their rotor blades 113 to rotate, which in turn generates lift. Further, the pitch of each rotor blade 113 can be adjusted in order to selectively control direction, thrust, and/or lift for tiltrotor aircraft 100. Moreover, nacelles 114a,b are capable of pivoting or rotating in order to enable tiltrotors 110a,b to alternate between helicopter mode, in which tiltrotors 110a,b are approximately vertical, and airplane mode, in which tiltrotors 110a,b are approximately horizontal. Further, wing 104 is used to produce lift when tiltrotor aircraft 100 is in airplane mode. Empennage 106 is the tail assembly of tiltrotor aircraft 100 and includes horizontal and vertical stabilizers for improving control and/or stability of the aircraft.

During operation, tiltrotor aircraft 100 may be subjected to vibrations. For example, during flight, tiltrotors 110a,b may produce vibrations throughout tiltrotor aircraft 100. Excessive vibrations may be harmful to an aircraft, however, as they can negatively impact its structural integrity, mechanical integrity, and/or performance. Moreover, excessive vibrations are often undesirable to passengers of an aircraft, as the vibrations can produce loud noise and/or cause the aircraft to shake, which negatively impacts passenger comfort.

Accordingly, in the illustrated embodiment, tiltrotor aircraft 100 includes a hydraulic vibration control system to provide active vibration control (AVC) during operation of the aircraft. For example, as shown in FIG. 1B, a plurality of hydraulic force generating devices or actuators 120a-c are mounted within the nacelle 114 of each tiltrotor 110 of tiltrotor aircraft 100. Moreover, hydraulic force generating devices 120a-c are each capable of generating a controllable force, and thus they can be selectively controlled to generate forces designed to cancel vibrations. In the illustrated embodiment, for example, hydraulic force generating devices 120a-c can generate forces that are optimized for cancelling the vibrations of the respective tiltrotor 110 on which they are mounted. Moreover, although hydraulic force generating devices 120a-c are mounted within a tiltrotor 110 in the example of FIG. 1B, in other embodiments they may be positioned in a variety of locations on an aircraft, including both fixed-frame (e.g., airframe) and rotating-frame (e.g., rotor) portions of the aircraft. In this manner, hydraulic force generating devices 120 can be selectively positioned throughout an aircraft in order to effectively control vibrations throughout the aircraft during operation.

In some embodiments, for example, a hydraulic force generating device 120 may be a self-contained device that is capable of generating a controllable force. For example, in order to effectively control vibrations, the hydraulic force generating device 120 may be capable of adjusting the magnitude, frequency, and phase of its generated force. In this manner, the hydraulic force generating device 120 can be used to generate a controllable force designed to reduce or cancel vibrations. For example, in some embodiments, the hydraulic force generating device 120 may be designed to generate a force using one or more moving masses powered by hydraulics. In some embodiments, for example, tungsten weights could be used as the moving masses. Moreover, the hydraulic force generating device 120 may be implemented as either a centrifugal force generating device (e.g., device 200 of FIG. 2) or a linear force generating device (e.g., device 300 or 400 of FIGS. 3 and 4). For example, a centrifugal force generating device may be designed to generate a centrifugal force using rotating unbalance masses, while a linear force generating device may be designed to generate a linear force using an oscillating inertial mass. In the illustrated embodiment of FIG. 1B, hydraulic force generating devices 120a-c are illustrated as centrifugal force generating devices. In other embodiments, however, hydraulic force generating devices 120a-c could be implemented as either centrifugal force generating devices, linear force generating devices, and/or a combination of both. Example embodiments of centrifugal and linear force generating devices that could be used to implement the hydraulic force generating devices 120a-c of FIG. 1B are further illustrated and described in connection with FIGS. 2-4.

The hydraulic vibration control system and associated force generators described throughout this disclosure provide numerous advantages, such as effectively controlling, reducing, and/or cancelling vibrations in any environment, including aircraft, vehicles, vessels, and/or any other applications, use cases, or industries with a need for vibration reduction at discrete frequencies. Moreover, hydraulic force generators provide various advantages over other potential approaches, such as electric force generators powered by electric motors. For example, an electric force generator is constrained by temperature limitations, as an electric motor is not suited for high-temperature environments unless an additional dedicated cooling mechanism is provided. A hydraulic force generator, however, does not suffer from the same temperature limitations as an electric force generator. Accordingly, a hydraulic force generator is suitable for high-temperature environments, including near the rotors, propellers, engines, and/or gearboxes of an aircraft. Moreover, because hydraulic approaches provide better power density than electric approaches, a hydraulic force generator can be implemented with a smaller and lighter form factor than an electric force generator with comparable power. Further, because many aircraft already include hydraulic systems for other purposes, hydraulic force generators can be easily integrated with an existing hydraulic system of an aircraft.

Example embodiments are described further below with more particular reference to the remaining FIGURES. It should be appreciated that tiltrotor aircraft 100 of FIGS. 1A-B is merely illustrative of a variety of possible applications of the embodiments described throughout this disclosure. For example, other aircraft implementations could include various types of helicopters, rotorcraft, fixed wing airplanes, hybrid aircraft, gyrocopters, unmanned aircraft, and drones, among other examples. The described embodiments can also be used for non-aircraft implementations, such as land, water, and/or space-based vehicles, or any other applications, use cases, or industries that have a need for vibration reduction at discrete frequencies.

FIGS. 2A-C illustrate an example embodiment of a hydraulic-powered centrifugal or rotary force generator 200. In some embodiments, for example, centrifugal force generator 200 could be used to implement the force generating devices of a vibration control system (e.g., force generating devices 120a-c of the vibration control system of FIGS. 1A-B).

FIG. 2A illustrates centrifugal force generator 200 in its entirety, while FIGS. 2B and 2C illustrate cross-sections of the underlying hydraulic rotors 210a,b in various configurations. In the illustrated embodiment, for example, centrifugal force generator 200 is a self-contained device that is capable of producing a controllable centrifugal force using a pair of hydraulic-powered rotors 210a,b with rotating unbalance masses 214a,b. For example, in order to provide full control of the net centrifugal force generated by centrifugal force generator 200, at least two independently controlled hydraulic rotors 210a,b are used to enable the relative rotational position of their respective unbalance masses 214a,b to be adjusted. In this manner, by adjusting the relative position of the unbalance masses 214a,b of hydraulic rotors 210a,b, centrifugal force generator 200 can be controlled to produce a net centrifugal force ranging from zero to the maximum force supported, as described further below.

In the illustrated embodiment, for example, hydraulic rotors 210a,b are contained in the same external housing 202 in order to minimize the overall size and weight of centrifugal force generator 200, but they are otherwise independently driven and controlled. For example, each hydraulic rotor 210a,b respectively includes a shaft 211a,b, motor gear 212a,b, rotor gear 213a,b, unbalance mass 214a,b, hydraulic inlet port 215a,b, and hydraulic outlet port 216a,b, as described further below.

With respect to an individual hydraulic rotor 210, for example, hydraulic inlet and outlet ports 215 and 216 allow hydraulic fluid 217 to flow through the hydraulic rotor 210. In some embodiments, for example, the flow of hydraulic fluid 217 through inlet and outlet ports 215 and 216 may be controlled by a hydraulic control valve (not shown), such as an electrohydraulic servo valve. In this manner, the hydraulic control valve can be used to adjust the fluid pressure at the respective inlet and outlet ports 215 and 216 in order to create a pressure differential that drives rotation of motor gear 212 of hydraulic rotor 210. For example, the flow of hydraulic fluid 217 through inlet and outlet ports 215 and 216 can be adjusted in order to achieve fluid pressure that is significantly larger at inlet port 215 than at outlet port 216, thus resulting in a pressure differential across inlet and outlet ports 215 and 216. In this manner, the pressure differential causes motor gear 212 to rotate around an axis of rotation of shaft 211. Moreover, the rotation of motor gear 212 drives rotation of rotor gear 213 through the engagement of gear teeth. Further, an unbalance mass 214 is mounted on rotor gear 213 at a particular radial location relative to the center of rotation, and therefore unbalanced mass 214 also rotates with rotor gear 213. In this manner, the rotation of unbalance mass 214 produces a centrifugal force.

The magnitude of the resulting centrifugal force (F) produced by a hydraulic rotor 210 is the product of the mass quantity of unbalance mass 214 (m), the radial location of unbalance mass 214 (R), and the frequency of rotation (w) squared: $F=m*R*w^2$. Moreover, the frequency of the generated force can be adjusted by changing the rate of flow of hydraulic fluid 217 in order to alter the rotational speed of unbalance mass 214. For example, increasing the flow rate of hydraulic fluid 217 causes the rotational speed of unbalance mass 214 to increase, which increases the frequency of the generated force, while decreasing the rate of flow causes the frequency of the generated force to decrease in a similar manner. The phase of the generated force (e.g., relative to an aircraft rotor) can be adjusted by momentarily increasing or decreasing the rotational speed of unbalance mass 214 until the appropriate phase is achieved, and then subsequently restoring the rotational speed to a steady state level corresponding to the desired frequency of the force.

A single hydraulic rotor 210, however, is unable to control or adjust the magnitude of the centrifugal force (F) generated at a particular frequency (w). Accordingly, in order to fully control the magnitude of the centrifugal force, centrifugal force generator 200 includes a pair of hydraulic rotors 210a,b that are capable of independently controlling the rotational speed and position of their respective unbalance masses 214a,b. In this manner, centrifugal force generator 200 can control the net force produced by hydraulic rotors 210a,b by adjusting the relative rotational position of their respective unbalance masses 214a,b. Accordingly, centrifugal force generator 200 can control the magnitude of the resulting force to range from zero to a maximum possible value.

For example, as shown in FIG. 2B, centrifugal force generator 200 can produce a force of zero by configuring the relative rotational position of unbalance masses 214a,b to be out-of-phase by 180 degrees. For example, in FIG. 2B, the rotational position of unbalance mass 214a of hydraulic rotor 210a is 180 degrees from the rotational position of unbalance mass 214b of hydraulic rotor 210b. Accordingly, the centrifugal forces produced by the respective hydraulic rotors 210a,b cancel each other out, thus resulting in a net force of zero.

As shown in FIG. 2C, on the other hand, centrifugal force generator 200 can produce a maximum possible force by configuring unbalance masses 214a,b to have the same rotational position or phase, such that they are in-phase or zero degrees apart. For example, in FIG. 2C, the rotational position of unbalance mass 214a of hydraulic rotor 210a is identical to the rotational position of unbalance mass 214b of hydraulic rotor 210b. Accordingly, the centrifugal forces produced by the respective hydraulic rotors 210a,b are additive or cumulative, thus resulting in a net force with the maximum value possible.

In this manner, by adjusting the relative position of unbalance masses 214a,b anywhere from zero to 180 degrees, centrifugal force generator 200 can control the magnitude of the resulting force to range from zero to the maximum possible value. Accordingly, centrifugal force generator 200 can be used to generate a controllable force designed to cancel or reduce vibrations, and thus can be used to implement an active vibration control system, as described further throughout this disclosure.

FIGS. 3A-B illustrate an example embodiment of a hydraulic-powered linear force generator 300. In some embodiments, for example, linear force generator 300 could be used to implement the force generating devices of a vibration control system (e.g., force generating devices 120a-c of the vibration control system of FIGS. 1A-B).

FIGS. 3A and 3B each illustrate a different configuration of linear force generator 300. In the illustrated embodiment, for example, linear force generator 300 is a self-contained device that is capable of producing a controllable linear force using a moving mass 304 powered by hydraulics. For example, linear force generator 300 includes an external housing 302 with a hollow chamber 303 that contains a moving mass 304. Linear force generator 300 also includes a pair of hydraulic pistons 306a,b, a pair of springs 308a,b, a pair of hydraulic ports 314a,b, a pair of hydraulic fluid pathways 315a,b, and a hydraulic control valve 310 with fluid supply and return lines 311 and 312.

In some embodiments, for example, hydraulic control valve 310 may be an electrohydraulic servo valve. Accordingly, control valve 310 can be used to regulate the flow of hydraulic fluid 317 at the fluid supply and return lines 311 and 312 in order to create a pressure differential across the supply and return lines 311 and 312. For example, the flow of hydraulic fluid 317 can be adjusted in order to achieve fluid pressure at supply line 311 that is significantly larger than the fluid pressure at return line 312. Moreover, control valve 310 can also interchange the particular hydraulic port 314a or 314b that each fluid line 311 and 312 is connected to. In particular, control value 310 can selectively direct fluid from the respective fluid lines 311 and 312 to either hydraulic port 314a or hydraulic port 314b. For example, control valve 310 can direct the high-pressure fluid from supply line 311 to hydraulic port 314a, while simultaneously directing the low-pressure fluid from return line 312 to hydraulic port 314b. Similarly, control valve 310 can reverse the fluid pathways by directing the high-pressure fluid from supply line 311 to hydraulic port 314b, while directing the low-pressure fluid from return line 312 to hydraulic port 314a. Further, hydraulic ports 314a,b are respectively connected to fluid pathways 315a,b that lead to hydraulic pistons 306a,b, and thus the hydraulic fluid 317 directed to each hydraulic port 314a,b flows through the respective fluid pathways 315a,b until reaching hydraulic pistons 306a,b. Moreover, hydraulic pistons 306a,b are respectively coupled to opposite ends of moving mass 304, and springs 308a,b are respectively positioned between opposite ends of moving mass 304 and the walls of hollow chamber 303.

Accordingly, control valve 310 can regulate the flow of hydraulic fluid 317 in order to create a fluid pressure differential between hydraulic ports 314a and 314b, which similarly produces a fluid pressure differential across pistons 306a and 306b. Moreover, the fluid pressure differential across pistons 306a and 306b causes moving mass 304 to be displaced relative to the walls of hollow chamber 303. For example, as shown in FIG. 3A, control valve 310 is directing high-pressure fluid from supply line 311 to hydraulic port 314a, and is directing low-pressure fluid from return line 312 to hydraulic port 314b. In this manner, the high-pressure fluid from supply line 311 flows through hydraulic port 314a and fluid pathway 315a until reaching piston 306a, which causes piston 306a to exert a force on moving mass 304 that displaces it towards the other end of hollow chamber 303. Moreover, control valve 310 can reverse the flow of hydraulic fluid 317 through fluid pathways 315a,b in order to displace moving mass 304 in the opposite direction. For example, as shown in FIG. 3B, control valve 310 is directing high-pressure fluid from supply line 311 to hydraulic port 314b, and is directing low-pressure fluid from return line 312 to hydraulic port 314a. In this manner, the high-pressure fluid from supply line 311 flows through hydraulic port 314b and fluid pathway 315b until reaching piston 306b, which causes piston 306b to exert a force on moving mass 304 that pushes moving mass 304 towards the opposite end of hollow chamber 303. In this manner, control valve 310 can continuously interchange the connection of fluid lines 311 and 312 with fluid pathways 315a,b in order to cause moving mass 304 to oscillate between the walls of hollow chamber 303.

The linear force (F) produced by linear force generator 300 is the product of the mass quantity of moving mass 304 (m), the oscillatory displacement amplitude of moving mass 304 (X), and the oscillatory frequency of moving mass 304 (w) squared: $F=m*X*w^2$. The frequency of the generated force can be controlled by changing the rate or speed in which control valve 310 switches the flow of high-pressure fluid between the respective hydraulic ports 314a,b and fluid pathways 315a,b. The phase of the generated force (e.g., relative to an aircraft rotor) can be adjusted by momentarily increasing or decreasing the fluid switching rate of control valve 310 until the appropriate phase is achieved, and then subsequently restoring the fluid switching rate to a steady state level corresponding to the desired frequency of the force. Finally, the magnitude of the generated force can be controlled by using control valve 310 to adjust the volume of hydraulic fluid 317 flowing to the respective pistons 306a,b. For example, adjusting the volume of fluid 317 that flows to pistons 306a,b results in a corresponding change in the oscillatory displacement amplitude (X) of moving mass 304. In this manner, the magnitude of the generated force can be adjusted from zero to a maximum possible value by adjusting the fluid volume to achieve the appropriate oscillatory displacement amplitude (X) of moving mass 304. Accordingly, linear force generator 300 can be used to generate a controllable force designed to cancel or reduce vibrations, and thus can be used to implement an active vibration control system, as described further throughout this disclosure.

Figure 4A:
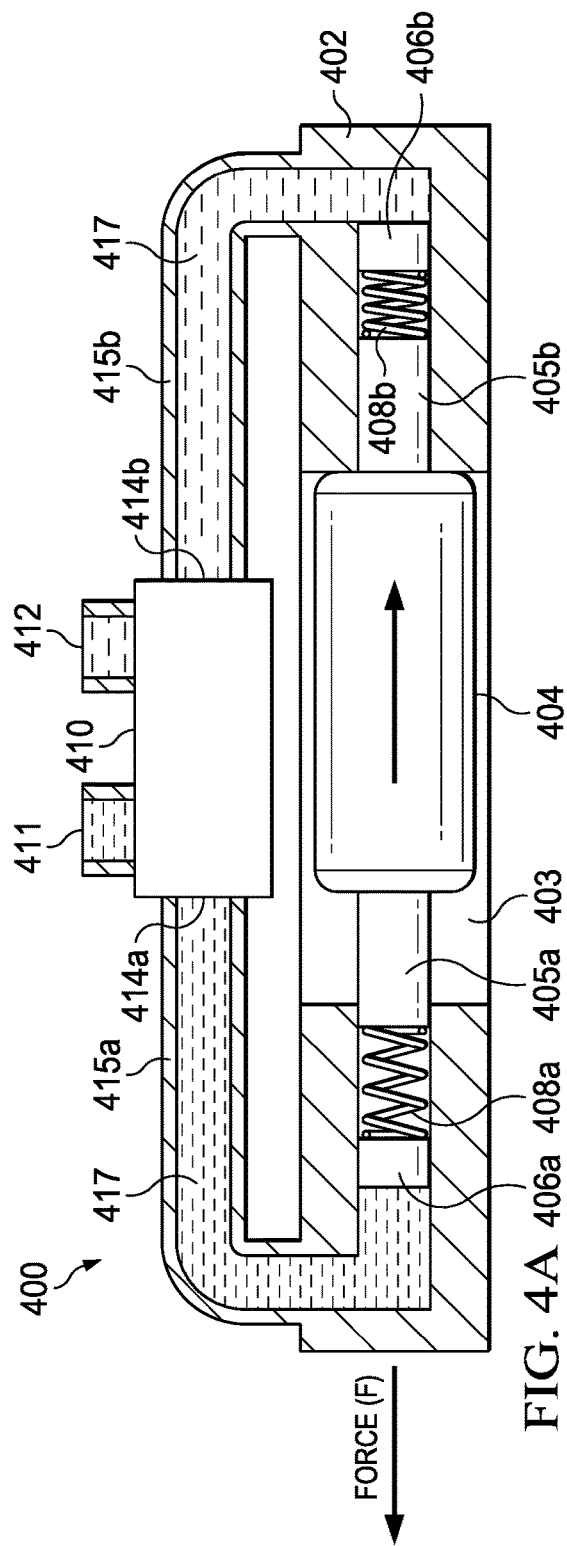
FIGS. 4A-B illustrate an alternative embodiment of a hydraulic-powered linear force generator.
Figure 4B:
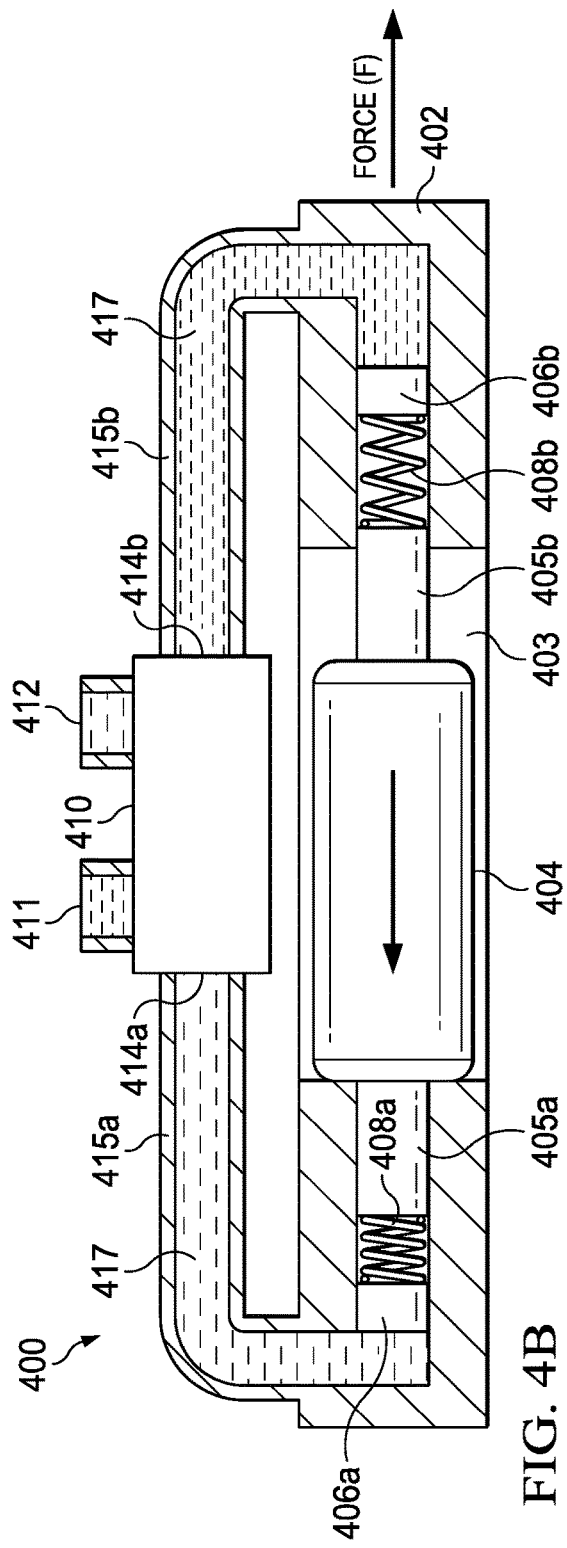

FIGS. 4A-B illustrate an alternative embodiment of a hydraulic-powered linear force generator 400. In the illustrated embodiment, linear force generator 400 includes housing 402, hollow chamber 403, moving mass 404, pistons 406a,b, springs 408a,b, hydraulic control valve 410, hydraulic supply and return lines 411 and 412, hydraulic ports 414a,b, and fluid pathways 415a,b for hydraulic fluid 417.

In some embodiments, the components of linear force generator 400 may be similar to the similarly labeled components of linear force generator 300 of FIGS. 3A-B, with the exception of the arrangement and interaction of the pistons 406a,b, springs 408a,b, and moving mass 404 of linear force generator 400. For example, with respect to linear force generator 300 of FIGS. 3A-B, pistons 306a,b are integrated with moving mass 304, and springs 308a,b are in contact with moving mass 304 and the walls of hollow chamber 303. With respect to linear force generator 400 of FIGS. 4A-B, however, pistons 406a,b are not integrated with moving mass 404, but instead are indirectly coupled to moving mass 404 via springs 408a,b. For example, pistons 406a,b are respectively in contact with springs 408a,b, and springs 408a,b are further in contact with arms 405a,b of moving mass 404. An advantage of this approach is that moving mass 404 and springs 408a,b are designed to function as a tuned vibration absorber, thus minimizing the hydraulic power required to oscillate moving mass 404, while also providing some level of oscillation and vibration attenuation even in the absence of hydraulic power (e.g., in the event of a fault or failure).

Figure 5:
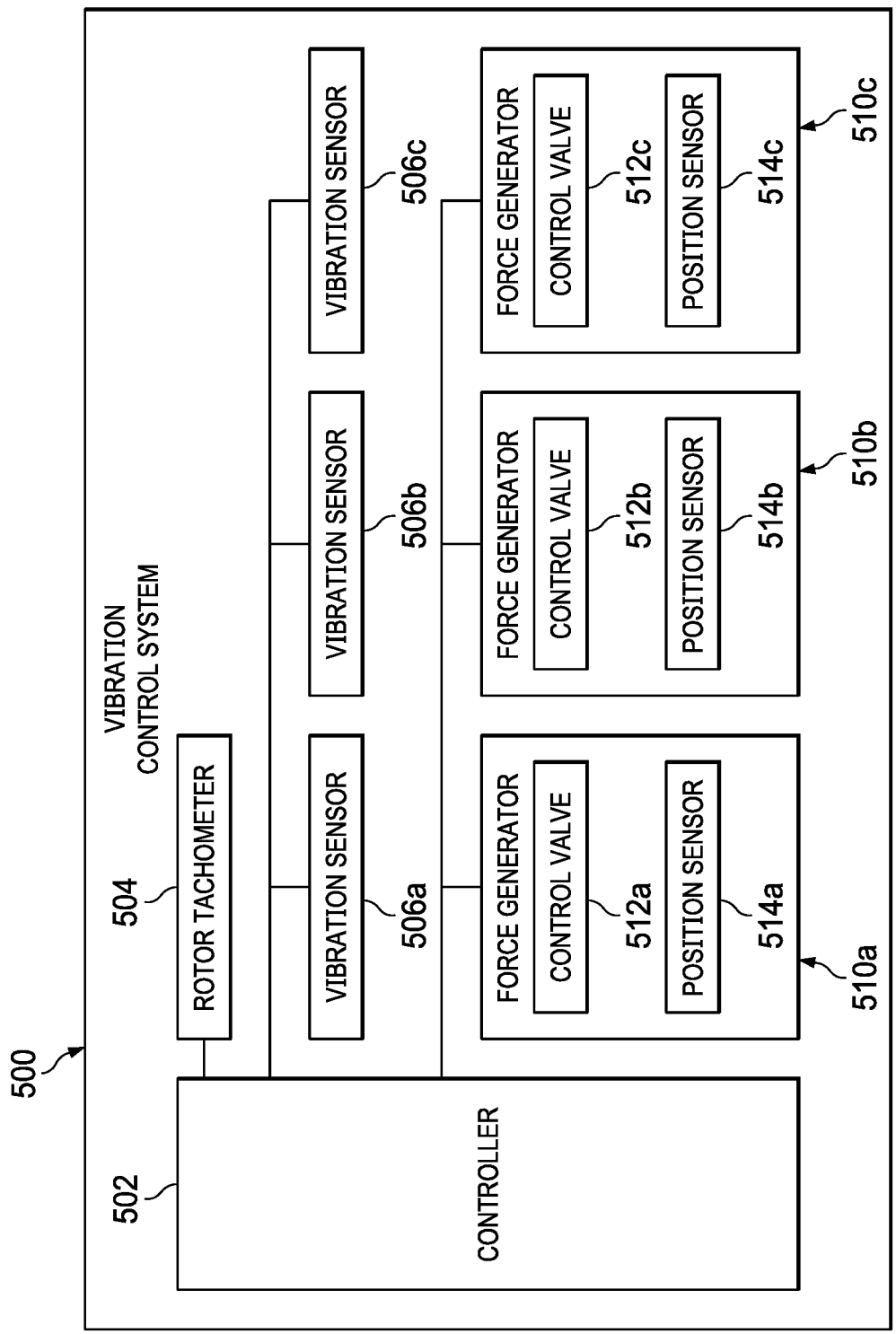
FIG. 5 illustrates a block diagram of a hydraulic vibration control system.

FIG. 5 illustrates a block diagram of a hydraulic vibration control system 500. In some embodiments, for example, vibration control system 500 could be used to control vibrations on an aircraft, such as tiltrotor aircraft 100 of FIGS. 1A-B. In the illustrated embodiment, vibration control system 500 includes a controller 502, tachometer 504, vibration sensors 506a-c, and force generators 510a-c, as described further below.

Controller 502 may include any combination of hardware and/or software logic configured to control the operation of vibration system 500, as described further below. In some embodiments, for example, controller 502 may include a processor, controller, application specific integrated circuit (ASIC), field programmable gate array (FPGA), and/or any other type of electronic circuitry.

Tachometer 504 may include any device configured to track the rotational speed and/or phase of a rotating component, such as a rotor, propeller, and/or engine of an aircraft. Moreover, in some embodiments, vibration control system 500 may include multiple tachometers 504 in order to separately track multiple rotors, propellers, and/or engines of an aircraft.

Vibration sensors 506a-c may include any type of device or sensor that is capable of measuring vibrations in a particular environment, such as on an aircraft. In some embodiments, for example, vibration sensors 506a-c may be accelerometers. Moreover, vibration sensors 506a-c may be positioned throughout an aircraft in order to measure vibrations at various locations of the aircraft. For example, in some embodiments, vibration sensors 506a-c may be positioned near the rotors, propellers, and/or engines of the aircraft in order to measure the vibrations produced by those components.

Force generators 510a-c may include any type of device capable of generating a controllable force. In some embodiments, for example, force generators 510a-c may be hydraulically powered devices that are each capable of generating a centrifugal or linear force using one or more rotating or moving masses. For example, in some embodiments, force generators 510a-c may include centrifugal force generators (e.g., centrifugal force generator 200 of FIGS. 2A-C), linear force generators (e.g., linear force generators 300 and 400 of FIGS. 3A-B and 4A-B), and/or a combination thereof.

Moreover, in the illustrated embodiment, each force generator 510*a-c* respectively includes a control valve 512*a-c* and a position sensor 514*a-c* (among other components not shown). The control valve 512*a-c* may be used, for example, to control the flow of hydraulic fluid through a force generator 510*a-c* in order to control the resulting force produced by a moving mass of the force generator (e.g., as described further throughout this disclosure). Further, the position sensor 514*a-c* may be used to track the position and/or speed of a moving mass of the force generator 510*a-c*. Moreover, in some embodiments, a force generator 510 may include multiple control valves 512 and/or position sensors 514. A centrifugal force generator 510, for example, may be implemented using a pair of independently controlled rotating masses, and thus may include a separate control valve 512 and/or position sensor 514 associated with each rotating mass. Further, in some embodiments, the position sensors 514 of centrifugal force generators 510 may be implemented using hall effect sensors that are designed to track the rotational position/phase and speed of the rotating masses.

In the illustrated embodiment, controller 502 is configured to control the operation of vibration control system 500. For example, controller 502 may use tachometer 504 to determine the rotational speed and phase of a rotor that may be producing vibrations during operation of a rotorcraft. Moreover, controller 502 may use vibration sensors 506*a-c* to obtain measurements of the vibrations in various locations of the rotorcraft, such as near the rotor that is being monitored by tachometer 504. Accordingly, based on the information from tachometer 504 and vibration sensors 506*a-c*, controller 502 may then configure force generators 510*a-c* to produce controlled forces designed to cancel or reduce the vibrations produced by the rotor. For example, the information from tachometer 504 enables controller 502 to determine the frequency and phase of the vibrations produced by the rotor, and the information from vibration sensors 506*a-c* enables controller 502 to determine the magnitude of the vibrations. Accordingly, controller 502 can then configure each force generator 510*a-c* to produce a force with an appropriate frequency, phase, and magnitude for cancelling the rotor vibrations. In some embodiments, for example, controller 502 can determine the current state of a particular force generator 510 using the associated position sensor(s) 514 to determine the current position and speed of its moving mass(es). Controller 502 can then use the control valve(s) 512 of the particular force generator 510 to adjust the flow of hydraulic fluid in order to cause the force generator to produce a force with the appropriate frequency, phase, and magnitude.

In this manner, controller 502 can continuously re-configure force generators 510*a-c* in order to generate forces that are designed to cancel or reduce the vibrations produced by the rotor.

Figure 6:
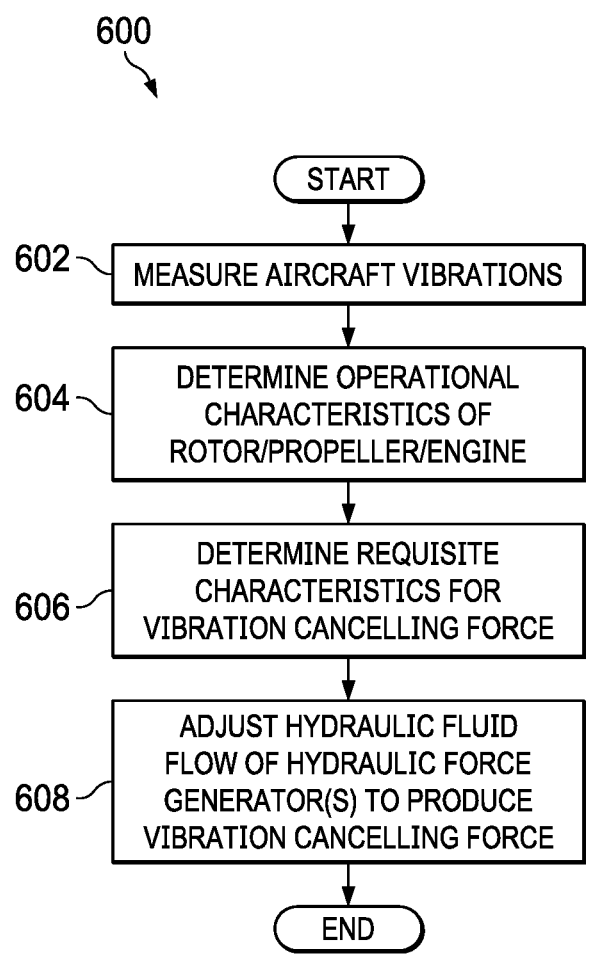
FIG. 6 illustrates a flowchart for an example embodiment of aircraft vibration control.

FIG. 6 illustrates a flowchart 600 for an example embodiment of aircraft vibration control. In some embodiments, for example, flowchart 600 may be implemented by a hydraulic vibration control system, such as vibration control system 500 of FIG. 5.

The flowchart may begin at block 602 by measuring vibrations throughout an aircraft. In some embodiments, for example, one or more vibration sensors (e.g., accelerometers) may be positioned throughout the aircraft in order to measure vibrations at various locations of the aircraft. Moreover, in some embodiments, the aircraft could be a rotorcraft, tiltrotor aircraft, or fixed-wing airplane, among other examples. Further, in some embodiments, the vibration sensors may be positioned near the rotors, propellers, and/or engines of the aircraft. In this manner, the vibration sensors can be used to determine the magnitude of the vibrations near the rotors, propellers, and/or engines.

The flowchart may then proceed to block 604 to determine the operational characteristics of the rotors, propellers, and/or engines of the aircraft. In some embodiments, for example, one or more tachometers may be used to track the rotational speed and/or phase of the rotors, propellers, and/or engines of the aircraft. In this manner, the information from the tachometer(s) can be used to determine the frequency and phase of the vibrations produced by the rotors, propellers, and/or engines.

The flowchart may then proceed to block 606 to determine the requisite characteristics for one or more vibration cancelling forces designed to cancel the vibrations produced by the rotors, propellers, and/or engines. In some embodiments, for example, the requisite characteristics or parameters for the vibration cancelling forces may include a frequency, phase, and/or magnitude for each vibration cancelling force. Moreover, the appropriate frequency, phase, and/or magnitude for each vibration cancelling force may be determined based on the identified frequency, phase, and/or magnitude of the respective vibrations.

The flowchart may then proceed to block 608 to adjust the hydraulic fluid flow of one or more hydraulic force generator(s) to produce the vibration cancelling force(s). In some embodiments, for example, the aircraft may include one or more hydraulic force generators that are each capable of generating a controllable force using one or more moving masses powered hydraulically. The hydraulic force generators, for example, may include centrifugal force generators, linear force generators, and/or a combination thereof. Accordingly, in some embodiments, a control valve of each hydraulic force generator may be used to adjust the flow of hydraulic fluid in order to cause the particular force generator to produce a force with an appropriate frequency, phase, and magnitude designed to cancel certain vibrations. Moreover, the hydraulic force generators can be continuously re-configured in this manner in order to generate vibration cancelling forces with the appropriate frequency, phase, and/or magnitude.

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure (e.g., vibration control system 500 of FIG. 5 and/or flowchart 600 of FIG. 6) may be implemented using logic, instructions, and/or other information stored on any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A centrifugal force generating device, comprising:
a first hydraulic rotor comprising a first mass, wherein the first hydraulic rotor is configured to rotationally drive the first mass around a first axis of rotation using a first flow of hydraulic fluid through the first hydraulic rotor;
a second hydraulic rotor comprising a second mass, wherein the second hydraulic rotor is configured to rotationally drive the second mass around a second axis of rotation using a second flow of hydraulic fluid through the second hydraulic rotor; and
one or more hydraulic control valves configured to control the first flow of hydraulic fluid through the first hydraulic rotor and further configured to control the second flow of hydraulic fluid through the second hydraulic rotor;
wherein the first hydraulic rotor further comprises:
a first motor gear configured to rotate around a first shaft when driven by the first flow of hydraulic fluid through the first hydraulic rotor; and
a first rotor gear configured to be rotationally driven by the first motor gear, wherein the first mass is coupled to the first rotor gear and is configured to rotate with the first rotor gear.

2. The centrifugal force generating device of claim 1:
wherein the second hydraulic rotor further comprises:
a second motor gear configured to rotate around a second shaft when driven by the second flow of hydraulic fluid through the second hydraulic rotor; and
a second rotor gear configured to be rotationally driven by the second motor gear, wherein the second mass is coupled to the second rotor gear and is configured to rotate with the second rotor gear.

3. The centrifugal force generating device of claim 1, wherein the first mass and the second mass each comprise a tungsten weight.

4. The centrifugal force generating device of claim 1, wherein:
the first hydraulic rotor further comprises a first fluid inlet and a first fluid outlet; and
the second hydraulic rotor further comprises a second fluid inlet and a second fluid outlet.

5. The centrifugal force generating device of claim 1, further comprising one or more position sensors configured to track a rotational phase of each of the first mass and the second mass.

6. The centrifugal force generating device of claim 5, wherein the one or more position sensors comprise one or more hall effect sensors.

7. The centrifugal force generating device of claim 1, wherein the one or more hydraulic control valves are further configured to:
adjust the first flow of hydraulic fluid through the first hydraulic rotor to control a first rotational frequency of the first mass; and
adjust the second flow of hydraulic fluid through the second hydraulic rotor to control a second rotational frequency of the second mass.

8. The centrifugal force generating device of claim 1, wherein the one or more hydraulic control valves are further configured to:
adjust the first flow of hydraulic fluid through the first hydraulic rotor to control a first rotational phase of the first mass; and
adjust the second flow of hydraulic fluid through the second hydraulic rotor to control a second rotational phase of the second mass.

9. The centrifugal force generating device of claim 1, wherein the one or more hydraulic control valves are further configured to adjust at least one of the first flow of hydraulic fluid and the second flow of hydraulic fluid to control a relative phase of the first mass and the second mass.

10. A vibration control system, comprising:
one or more centrifugal force generators, wherein each centrifugal force generator comprises:
a first hydraulic rotor comprising a first mass, wherein the first hydraulic rotor is configured to rotationally drive the first mass around a first axis of rotation using a first flow of hydraulic fluid through the first hydraulic rotor;
a second hydraulic rotor comprising a second mass, wherein the second hydraulic rotor is configured to rotationally drive the second mass around a second axis of rotation using a second flow of hydraulic fluid through the second hydraulic rotor; and one or more hydraulic control valves configured to control the first flow of hydraulic fluid through the first hydraulic rotor and further configured to control the second flow of hydraulic fluid through the second hydraulic rotor; and a vibration controller configured to:
identify one or more vibrations;
determine one or more parameters of a vibration cancelling force for reducing the one or more vibrations; and
configure the one or more centrifugal force generators to produce the vibration cancelling force;

wherein the first hydraulic rotor further comprises:
a first motor gear configured to rotate around a first shaft when driven by the first flow of hydraulic fluid through the first hydraulic rotor; and
a first rotor gear configured to be rotationally driven by the first motor gear, wherein the first mass is coupled to the first rotor gear and is configured to rotate with the first rotor gear; and wherein the second hydraulic rotor further comprises:
a second motor gear configured to rotate around a second shaft when driven by the second flow of hydraulic fluid through the second hydraulic rotor; and
a second rotor gear configured to be rotationally driven by the second motor gear, wherein the second mass is coupled to the second rotor gear and is configured to rotate with the second rotor gear.

11. The vibration control system of claim 10, further comprising one or more vibration sensors to measure the one or more vibrations.

12. The vibration control system of claim 10, wherein each centrifugal force generator further comprises one or more position sensors configured to track a rotational phase of each of the first mass and the second mass.

13. The vibration control system of claim 12, wherein the one or more position sensors comprise one or more hall effect sensors.

14. The vibration control system of claim 10, wherein the vibration controller configured to configure the one or more centrifugal force generators to produce the vibration cancelling force is further configured to adjust a hydraulic fluid configuration of the one or more centrifugal force generators.

15. An aircraft, comprising:
a fuselage;
one or more centrifugal force generators, wherein each centrifugal force generator comprises:
a first hydraulic rotor comprising a first mass, wherein the first hydraulic rotor is configured to rotationally drive the first mass around a first axis of rotation using a first flow of hydraulic fluid through the first hydraulic rotor;
a second hydraulic rotor comprising a second mass, wherein the second hydraulic rotor is configured to rotationally drive the second mass around a second axis of rotation using a second flow of hydraulic fluid through the second hydraulic rotor; and one or more hydraulic control valves configured to control the first flow of hydraulic fluid through the first hydraulic rotor and further configured to control the second flow of hydraulic fluid through the second hydraulic rotor;

one or more vibration sensors configured to measure aircraft vibrations; and a vibration controller configured to:
identify the aircraft vibrations measured by the one or more vibration sensors;
determine one or more parameters of a vibration cancelling force for reducing the aircraft vibrations; and
configure the one or more centrifugal force generators to produce the vibration cancelling force;

wherein the first hydraulic rotor further comprises:
a first motor gear configured to rotate around a first shaft when driven by the first flow of hydraulic fluid through the first hydraulic rotor; and
a first rotor gear configured to be rotationally driven by the first motor gear, wherein the first mass is coupled to the first rotor gear and is configured to rotate with the first rotor gear; and wherein the second hydraulic rotor further comprises:
a second motor gear configured to rotate around a second shaft when driven by the second flow of hydraulic fluid through the second hydraulic rotor; and
a second rotor gear configured to be rotationally driven by the second motor gear, wherein the second mass is coupled to the second rotor gear and is configured to rotate with the second rotor gear.

16. The aircraft of claim 14, wherein each centrifugal force generator further comprises one or more position sensors configured to track a rotational phase of each of the first mass and the second mass.

17. The aircraft of claim 14, wherein:
the aircraft is a rotorcraft and further comprises one or more rotor systems; and
the one or more vibration sensors configured to measure the aircraft vibrations are further configured to measure the aircraft vibrations produced by the one or more rotor systems.

18. The aircraft of claim 17:
further comprising one or more tachometers configured to track a rotational status of the one or more rotor systems; and
wherein the vibration controller configured to determine the one or more parameters of the vibration cancelling force for reducing the aircraft vibrations is further configured to determine the one or more parameters of the vibration cancelling force based on:
the aircraft vibrations produced by the one or more rotor systems; and
the rotational status of the one or more rotor systems.

19. The aircraft of claim 17, wherein the rotorcraft is a tiltrotor aircraft, and wherein the one or more rotor systems comprise one or more tiltrotors.

20. The aircraft of claim 14, further comprising one or more linear force generators.

* * * * *